(12) United States Patent
Chen et al.

(10) Patent No.: US 10,779,299 B2
(45) Date of Patent: Sep. 15, 2020

(54) V2V COMMUNICATION METHOD, APPARATUS, AND TERMINAL

(71) Applicant: HUAWEI TECHNOLOGIES CO., LTD., Shenzhen, Guangdong (CN)

(72) Inventors: Guangri Chen, Shenzhen (CN); Zhenshan Zhao, Shenzhen (CN); Zhe Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/185,926

(22) Filed: Nov. 9, 2018

(65) Prior Publication Data

US 2019/0082444 A1   Mar. 14, 2019

Related U.S. Application Data (63) Continuation of application No. PCT/CN2016/081557, filed on May 10, 2016.

(51) Int. Cl.
*H04W 72/12* (2009.01)
*H04W 72/04* (2009.01)
(Continued)

(52) U.S. Cl.
CPC .......... *H04W 72/12* (2013.01); *H04L 5/0048* (2013.01); *H04W 4/46* (2018.02); *H04W 72/0406* (2013.01); *H04W 88/02* (2013.01)

(58) Field of Classification Search
None
See application file for complete search history.

(56) References Cited

U.S. PATENT DOCUMENTS

| | | |
|---|---|---|
| 2010/0165882 A1 | 7/2010 | Palanki et al. |
| 2010/0169498 A1 | 7/2010 | Palanki et al. |

(Continued)

FOREIGN PATENT DOCUMENTS

| | | |
|---|---|---|
| CN | 102265699 A | 11/2011 |
| CN | 102272746 A | 12/2011 |

(Continued)

OTHER PUBLICATIONS

R1-162641 Huawei, HiSilicon,"Details of sensing based collision avoidance",3GPP TSG RAN WG1 Meeting #84, Busan, Korea, Apr. 11-15, 2016,total 8 pages.

(Continued)

*Primary Examiner* — Yaotang Wang
(74) *Attorney, Agent, or Firm* — Fish & Richardson P.C.

(57) ABSTRACT

The present invention relates to a V2V communication method, apparatus, and terminal. The method includes: receiving, by a first terminal, a first scheduling assignment SA message that is sent by a second terminal, where the first SA message includes a first pilot resource and a first diversity multiplexing mode that are used by the second terminal; determining, by the first terminal based on the first pilot resource and the first diversity multiplexing mode, a second pilot resource and a second diversity multiplexing mode that are to be used by the first terminal; and sending, by the first terminal, a data stream to a third terminal based on the second pilot resource and the second diversity multiplexing mode.

8 Claims, 5 Drawing Sheets

(51) Int. Cl.
*H04W 4/46* (2018.01)
*H04L 5/00* (2006.01)
*H04W 88/02* (2009.01)

(56) References Cited

U.S. PATENT DOCUMENTS

| | | |
|---|---|---|
| 2014/0241219 A1 | 8/2014 | Patil et al. |
| 2015/0334721 A1 | 11/2015 | Kim et al. |
| 2015/0382366 A1 | 12/2015 | Wang |
| 2016/0183276 A1 | 6/2016 | Marinier et al. |
| 2016/0302223 A1* | 10/2016 | Song ................. H04W 72/1263 |
| 2017/0155434 A1 | 6/2017 | Kim et al. |
| 2017/0294980 A1 | 10/2017 | Wang et al. |
| 2018/0146491 A1* | 5/2018 | Kim ..................... H04W 24/10 |
| 2019/0191452 A1 | 6/2019 | Pelletier et al. |

FOREIGN PATENT DOCUMENTS

| | | |
|---|---|---|
| CN | 103856306 A | 6/2014 |
| CN | 104080176 A | 10/2014 |
| CN | 104125610 A | 10/2014 |
| CN | 104202821 A | 12/2014 |
| CN | 104335654 A | 2/2015 |
| CN | 104620658 A | 5/2015 |
| CN | 104640145 A | 5/2015 |
| CN | 105101045 A | 11/2015 |
| CN | 105453672 A | 3/2016 |
| CN | 105491674 A | 4/2016 |
| WO | 2015055257 A1 | 4/2015 |
| WO | 2016018094 A1 | 2/2016 |
| WO | 2016045564 A1 | 3/2016 |

OTHER PUBLICATIONS

International Search Report and Written Opinion issued in International Application No. PCT/CN2016/081557 dated Jan. 26, 2017, 15 pages.

R1-141349,LG Electronics:"Control design for D2D broadcast communication", 3GPP TSG RAN WG1 Meeting #76bis, Shenzhen, China, Mar. 31-Apr. 4, 2014. XP050787021. 6 pages.

Extended European Search Report issued in European Application No. 16901238 dated Feb. 27, 2019, 8 pages.

Office Action issued in Chinese Application No. 201680085239.0 dated Feb. 21, 2020, 11 pages (with English translation).

* cited by examiner

V2V COMMUNICATION METHOD, APPARATUS, AND TERMINAL

CROSS-REFERENCE TO RELATED APPLICATIONS

This application is a continuation of International Application No. PCT/CN2016/081557, filed on May 10, 2016, the disclosure of which is hereby incorporated by reference in its entirety.

TECHNICAL FIELD

The present invention relates to the field of communications technologies, and in particular, to a V2V communication method, apparatus, and terminal.

BACKGROUND

With continuous development of society, vehicles are increasingly popular. Driving travel brings some negative impact to the human society while facilitating travel of people. The rapid increase in a quantity of vehicles causes a series of problems, such as urban traffic congestion, frequent traffic accidents, and environmental quality deterioration. From a plurality of aspects of personal safety, transportation and travel efficiency, environmental protection, and economic effects, a complete intelligent transportation system (ITS) is required.

Figure 1:
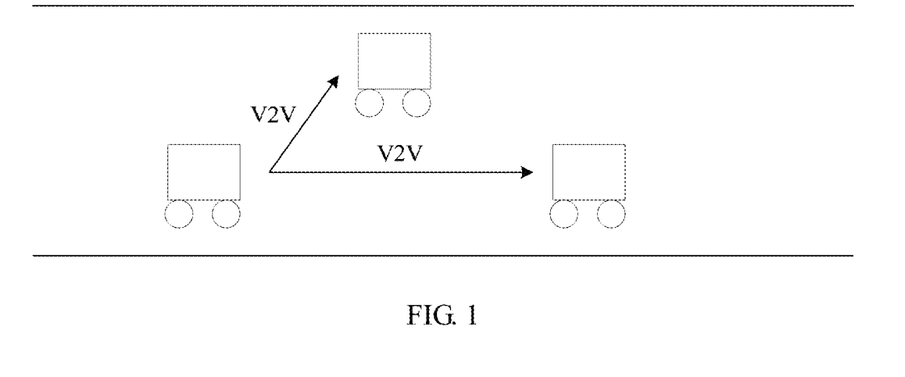
FIG. 1 is a schematic diagram of V2V communication in the prior art.

Currently, a vehicle may obtain road condition information or receive service information in time through vehicle-to-vehicle (V2V) communication. Specifically, through V2V communication, the vehicle may broadcast V2V service information (such as a vehicle speed, a travelling direction, a specific location, and whether a driver slams on emergency brakes) to a surrounding vehicle, and a driver may better perceive traffic conditions beyond a line of sight based on the road condition information or service information, so as to predict and avoid a dangerous situation. FIG. 1 is a schematic diagram of the V2V communication.

LTE is currently a mainstream wireless communications technology, where a device-to-device (D2D) communication technology supports direct communication between user terminals. Because a V2V communication scenario also belongs to direct communication between terminals (such as in-vehicle devices), a V2V service may be transmitted by using the D2D technology. In other words, V2V service information is transmitted through air interface multiplexing, to ensure an information transmission rate and an information transmission accuracy rate, and improve utilization of air interface resources.

However, because the D2D technology uses a distributed transmission mode, a plurality of adjacent terminals select a same time-frequency resource to send data. This may increase interference caused by resource reuse between terminals, and affect correct demodulation of data by the terminals, making the driver unable to perceive traffic conditions beyond the line of sight and predict the dangerous situation.

SUMMARY

Embodiments of the present invention provide a V2V communication method, apparatus, and terminal, so as to resolve a prior-art problem that correct demodulation of data by a terminal is affected due to increasing interference caused by resource reuse between terminals.

According to a first aspect, an embodiment of the present invention provides a V2V communication method. The method includes: receiving, by a first terminal, a first scheduling assignment SA message that is sent by a second terminal, where the first SA message includes a first pilot resource and a first diversity multiplexing mode that are used by the second terminal; determining, by the first terminal based on the first pilot resource and the first diversity multiplexing mode, a second pilot resource and a second diversity multiplexing mode that are to be used by the first terminal; and sending, by the first terminal, a data stream to a third terminal based on the second pilot resource and the second diversity multiplexing mode. A terminal can know a pilot resource and a diversity multiplexing mode that are used by another terminal. This avoids interference caused by resource reuse, and increases a correctness rate of subsequent data demodulation.

In a possible design, the first terminal receives a notification message from a base station, where the notification message includes a set of pilot resources available to the terminals and a current diversity multiplexing mode. Through delivery of the set of pilot resources and the diversity multiplexing mode, the terminal can know all available pilot resources and a mode for sending a data stream subsequently.

In a possible design, the first terminal selects, from the set of pilot resources based on the first pilot resource, at least one pilot resource that is not used by the second terminal; uses the selected at least one pilot resource that is not used by the second terminal, as the second pilot resource to be used by the first terminal; determines, based on the first diversity multiplexing mode, whether the current diversity multiplexing mode is a diversity multiplexing mode paired with the first diversity multiplexing mode; and if the current diversity multiplexing mode is a diversity multiplexing mode paired with the first diversity multiplexing mode, uses the current diversity multiplexing mode as the second diversity multiplexing mode to be used by the first terminal. A terminal determines, based on a pilot resource and a diversity multiplexing mode that are used by another terminal, a pilot resource and a diversity multiplexing mode that are to be used by the terminal. This avoids that a plurality of terminals use a same pilot resource, thereby reducing interference caused by resource reuse and increasing a correctness rate of subsequent data demodulation.

In a possible design, the first SA message further includes a location of a time-frequency resource occupied by the first pilot resource; and the first terminal receives, based on the first pilot resource and the first diversity multiplexing mode, a data stream sent by the second terminal, and performs channel estimation and demodulation on the data stream by using the first SA message. Based on the SA message, the first terminal parses and displays the data stream sent by the second terminal, so that a user predicts a geographical location of the second terminal and a distance from the second terminal, and handles a dangerous situation in advance.

In a possible design, the first terminal sends a second SA message to the third terminal, where the second SA message includes the second pilot resource and the second diversity multiplexing mode that are to be used by the first terminal, and includes a location of a time-frequency resource occupied by the second pilot resource, and the second SA message is used by the third terminal to perform, based on the second pilot resource, the second diversity multiplexing mode, and the location of the time-frequency resource occupied by the second pilot resource, channel estimation and demodulation on the data stream sent by the first terminal.

In a possible design, when the first terminal selects one pilot resource as the second pilot resource, the first terminal sends one data stream to the third terminal based on the second pilot resource and the second diversity multiplexing mode; or when the first terminal selects a plurality of pilot resources as the second pilot resource, the first terminal sends a plurality of data streams to the third terminal based on the second pilot resource and the second diversity multiplexing mode. The terminal selects a plurality of pilot resources and transmits different data streams on a plurality of independent paths, thereby making full use of system resources and improving a system capacity.

In a possible design, the first SA message further includes a quantity of multiplexing layers of the first terminal, where the quantity of multiplexing layers is specifically a quantity of terminals occupying a same time-frequency resource. It may be understood that one time-frequency resource includes a plurality of pilots, and each pilot may be occupied by different terminals. In other words, a plurality of terminals may transmit different data streams by using a same time-frequency resource, thereby making full use of system resources and improving a system capacity.

According to a second aspect, an embodiment of the present invention provides a V2V communication apparatus. The apparatus includes: a receiving unit, configured to receive a first SA message that is sent by a second terminal, where the first SA message includes a first pilot resource and a first diversity multiplexing mode that are used by the second terminal; a determining unit, configured to determine, based on the first pilot resource and the first diversity multiplexing mode, a second pilot resource and a second diversity multiplexing mode that are to be used by the apparatus; and a sending unit, configured to send a data stream to a third terminal based on the second pilot resource and the second diversity multiplexing mode. A terminal can know a pilot resource and a diversity multiplexing mode that are used by another terminal. This avoids interference caused by resource reuse, and increases a correctness rate of subsequent data demodulation.

In a possible design, the receiving unit is further configured to receive a notification message from a base station, where the notification message includes a set of pilot resources available to the apparatus and the second terminal and a current diversity multiplexing mode. Through delivery of the set of pilot resources and the diversity multiplexing mode, the apparatus can know all available pilot resources and a mode for sending a data stream subsequently.

In a possible design, the determining unit is specifically configured to: select, from the set of pilot resources based on the first pilot resource, at least one pilot resource that is not used by the second terminal; use the selected at least one pilot resource that is not used by the second terminal, as the second pilot resource to be used by the apparatus; determine, based on the first diversity multiplexing mode, whether the current diversity multiplexing mode is a diversity multiplexing mode paired with the first diversity multiplexing mode; and if the current diversity multiplexing mode is a diversity multiplexing mode paired with the first diversity multiplexing mode, use the current diversity multiplexing mode as the second diversity multiplexing mode to be used by the apparatus. The apparatus determines, based on a pilot resource and a diversity multiplexing mode that are used by another terminal, a pilot resource and a diversity multiplexing mode that are to be used by the apparatus. This avoids that a plurality of terminals use a same pilot resource, thereby reducing interference caused by resource reuse and increasing a correctness rate of subsequent data demodulation.

In a possible design, the first SA message received by the receiving unit further includes a location of a time-frequency resource occupied by the first pilot resource; the receiving unit is further configured to receive, based on the first pilot resource and the first diversity multiplexing mode, a data stream sent by the second terminal; and the apparatus further includes a decoding unit, configured to perform channel estimation and demodulation on the data stream based on the first pilot resource, the first diversity multiplexing mode, and the location of the time-frequency resource occupied by the first pilot resource. Based on the SA message, the apparatus parses and displays the data stream sent by the second terminal, so that a user predicts a geographical location of the second terminal and a distance from the second terminal, and handles a dangerous situation in advance.

In a possible design, the sending unit is further configured to send a second SA message to the third terminal, where the second SA message includes the second pilot resource and the second diversity multiplexing mode that are to be used by the apparatus, and includes a location of a time-frequency resource occupied by the second pilot resource, and the second SA message is used by the third terminal to perform, based on the second pilot resource, the second diversity multiplexing mode, and the location of the time-frequency resource occupied by the second pilot resource, channel estimation and demodulation on the data stream sent by the sending unit.

In a possible design, the sending unit is specifically configured to: when the determining unit selects one pilot resource as the second pilot resource, send one data stream to the third terminal based on the second pilot resource and the second diversity multiplexing mode; or when the determining unit selects a plurality of pilot resources as the second pilot resource, send a plurality of data streams to the third terminal based on the second pilot resource and the second diversity multiplexing mode. The terminal selects a plurality of pilot resources and transmits different data streams on a plurality of independent paths, thereby making full use of system resources and improving a system capacity.

In a possible design, the first SA message further includes a quantity of multiplexing layers of the apparatus, where the quantity of multiplexing layers is specifically a quantity of terminals occupying a same time-frequency resource. It may be understood that one time-frequency resource includes a plurality of pilots, and each pilot may be occupied by different terminals. In other words, a plurality of terminals may transmit different data streams by using a same time-frequency resource, thereby making full use of system resources and improving a system capacity.

According to a third aspect, an embodiment of the present invention provides a terminal. The terminal has a function of implementing a terminal behavior in the foregoing method design. The function may be implemented by hardware, or may be implemented by hardware executing corresponding software. The hardware or software includes one or more units that correspond to the foregoing function.

According to the third aspect, the embodiment of the present invention provides the terminal. A structure of the terminal includes a processor, a transmitter, and a receiver. The processor is configured to support the terminal in performing a corresponding function in the foregoing method. The transmitter is configured to support communication between terminals, and send, to another terminal, the information or instruction used in the foregoing method. The receiver is configured to support communication between terminals, and receive, from another terminal, the information or instruction used in the foregoing method. The terminal may further include a memory. The memory is configured to be coupled to the processor, and stores a program instruction and data that are required by the terminal.

In a possible design, the receiver is configured to receive a first scheduling assignment SA message that is sent by a second terminal, where the first SA message includes a first pilot resource and a first diversity multiplexing mode that are used by the second terminal; at least one processor is configured to determine, based on the first pilot resource and the first diversity multiplexing mode, a second pilot resource and a second diversity multiplexing mode that are to be used by the terminal; and the transmitter is configured to send a data stream to a third terminal based on the second pilot resource and the second diversity multiplexing mode. A terminal can know a pilot resource and a diversity multiplexing mode that are used by another terminal. This avoids interference caused by resource reuse, and increases a correctness rate of subsequent data demodulation.

In a possible design, the receiver is further configured to receive a notification message from a base station, where the notification message includes a set of pilot resources available to the terminals and a current diversity multiplexing mode. Through delivery of the set of pilot resources and the diversity multiplexing mode, the terminal can know all available pilot resources and a mode for sending a data stream subsequently.

In a possible design, the at least one processor is configured to: select, from the set of pilot resources based on the first pilot resource, at least one pilot resource that is not used by the second terminal; use the selected at least one pilot resource that is not used by the second terminal, as the second pilot resource to be used by the terminal; determine, based on the first diversity multiplexing mode, whether the current diversity multiplexing mode is a diversity multiplexing mode paired with the first diversity multiplexing mode; and if the current diversity multiplexing mode is a diversity multiplexing mode paired with the first diversity multiplexing mode, use the current diversity multiplexing mode as the second diversity multiplexing mode to be used by the terminal. The terminal determines, based on a pilot resource and a diversity multiplexing mode that are used by another terminal, a pilot resource and a diversity multiplexing mode that are to be used by the terminal. This avoids that a plurality of terminals use a same pilot resource, thereby reducing interference caused by resource reuse and increasing a correctness rate of subsequent data demodulation.

In a possible design, the first SA message received by the receiver further includes a location of a time-frequency resource occupied by the first pilot resource; the receiver is further configured to receive, based on the first pilot resource and the first diversity multiplexing mode, a data stream sent by the second terminal; and the at least one processor is further configured to perform channel estimation and demodulation on the data stream based on the first pilot resource, the first diversity multiplexing mode, and the location of the time-frequency resource occupied by the first pilot resource. Based on the SA message, the terminal parses and displays the data stream sent by the second terminal, so that a user predicts a geographical location of the second terminal and a distance from the second terminal, and handles a dangerous situation in advance.

In a possible design, the transmitter is further configured to send a second SA message to the third terminal, where the second SA message includes the second pilot resource and the second diversity multiplexing mode that are to be used by the terminal, and includes a location of a time-frequency resource occupied by the second pilot resource, and the second SA message is used by the third terminal to perform, based on the second pilot resource, the second diversity multiplexing mode, and the location of the time-frequency resource occupied by the second pilot resource, channel estimation and demodulation on the data stream sent by the transmitter.

In a possible design, the transmitter is specifically configured to: when the at least one processor selects one pilot resource as the second pilot resource, send one data stream to the third terminal based on the second pilot resource and the second diversity multiplexing mode; or when the at least one processor selects a plurality of pilot resources as the second pilot resource, send a plurality of data streams to the third terminal based on the second pilot resource and the second diversity multiplexing mode. The terminal selects a plurality of pilot resources and transmits different data streams on a plurality of independent paths, thereby making full use of system resources and improving a system capacity.

In a possible design, the first SA message further includes a quantity of multiplexing layers of a first terminal, where the quantity of multiplexing layers is specifically a quantity of terminals occupying a same time-frequency resource. It may be understood that one time-frequency resource includes a plurality of pilots, and each pilot may be occupied by different terminals. In other words, a plurality of terminals may transmit different data streams by using a same time-frequency resource, thereby making full use of system resources and improving a system capacity.

According to the V2V communication method provided in the embodiments of the present invention, a terminal can know a pilot resource and a diversity multiplexing mode that are used by another terminal. This avoids that a plurality of terminals use a same pilot resource, thereby reducing interference caused by resource reuse and increasing a correctness rate of subsequent data demodulation.

DESCRIPTION OF EMBODIMENTS

The following clearly and completely describes the technical solutions in embodiments of the present invention with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

A network architecture and a service scenario that are described in the embodiments of the present invention are used to describe the technical solutions in the embodiments of the present invention more clearly, but do not limit the technical solutions provided in the embodiments of the present invention. A person of ordinary skill in the art may know that the technical solutions provided in the embodiments of the present invention are also applicable to similar technical problems as the network architecture evolves and a new service scenario appears.

Figure 2:
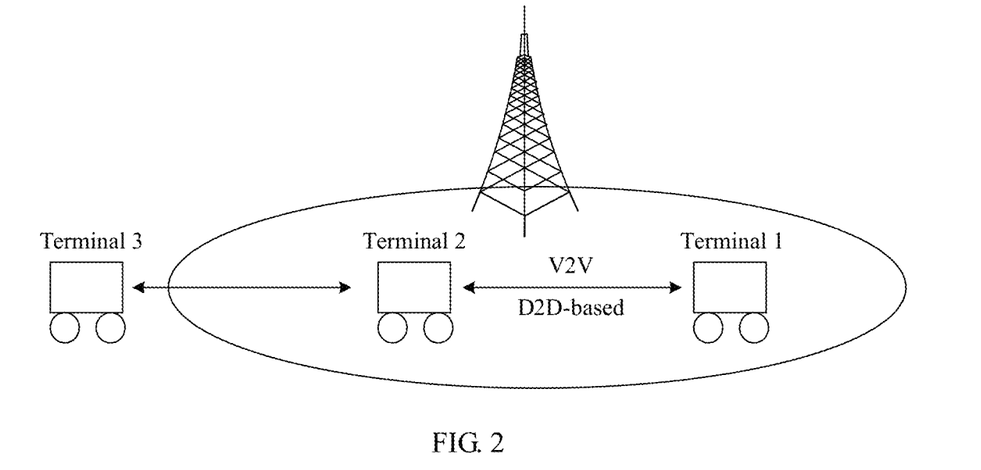
FIG. 2 is a schematic diagram of a possible system network according to an embodiment of the present invention.

As shown in FIG. 2, a plurality of terminals are connected to a same wireless network, and the terminals perform V2V communication and interaction by using a D2D technology. The technology described in the embodiments of the present invention may be applied to a Long Term Evolution (LTE) system, or other wireless communications systems that use various radio access technologies, for example, systems that use Code Division Multiple Access, Frequency Division Multiple Access, Time Division Multiple Access, orthogonal frequency division multiple access, single carrier frequency division multiple access, and other access technologies. Moreover, the communications system may also be applicable to a subsequent evolved system of the LTE system, for example, a fifth-generation 5G system. For clarity, only the LTE system is used as an example herein for description.

In the embodiments of the present invention, terms "network" and "system" are often interchangeably used, but meanings of the terms can be understood by a person skilled in the art. A terminal in the embodiments of the present invention may include various in-vehicle devices having a wireless communication function or other processing devices connected to a wireless modem. For ease of description, the devices mentioned above are collectively referred to as a terminal in the embodiments of the present invention. A base station (BS) in the embodiments of the present invention is an apparatus that is deployed in a radio access network and that is configured to provide a wireless communication function for a terminal. The base station may include various forms of macro base stations, micro base stations, relay stations, access points, and the like. A device with a base station function may have different names in systems that use different radio access technologies. For example, such a device is referred to as an evolved NodeB (eNB or eNodeB) in an LTE network, is referred to as a NodeB (NodeB) in a 3rd Generation 3G network, and the like. For ease of description, the above-mentioned apparatuses that provide a wireless communication function for UE are collectively referred to as a base station or a BS.

An embodiment of the present invention provides a V2V communication method, and an apparatus and a terminal based on the method. A plurality of terminals are connected to a same wireless network. A first terminal, a second terminal, and a third terminal in the wireless network are used as examples for description. The second terminal generates and sends a first scheduling assignment (SA) message. The first terminal receives the first SA message that is sent by the second terminal, determines, based on the first SA message, a pilot resource and a diversity multiplexing mode that are to be used by the first terminal, and sends a data stream to the third terminal based on the determined pilot resource and diversity multiplexing mode that are to be used by the first terminal.

In this embodiment of the present invention, an SA message that is sent by the second terminal may be received by a plurality of terminals (such as the first terminal and the third terminal), and only an example in which the SA message sent by the second terminal is received by the first terminal is used herein for description. Certainly, the first terminal may also receive a plurality of SA messages sent by other terminals, and only an example in which the first terminal receives the SA message of the second terminal is used herein for description.

It should be noted that in this embodiment of the present invention, each terminal may send an SA message. However, according to specifications of the prior-art D2D technology, after a receive terminal receives an SA message sent by a transmit terminal, the transmit terminal cannot receive an SA message sent by the receive terminal. Each SA message carries a pilot resource and a diversity multiplexing mode that are used by the transmit terminal, and the SA message is used by the receive terminal to determine, based on the pilot resource and the diversity multiplexing mode that are used by the transmit terminal, a pilot resource and a diversity multiplexing mode that are to be used by the receive terminal.

Figure 3:
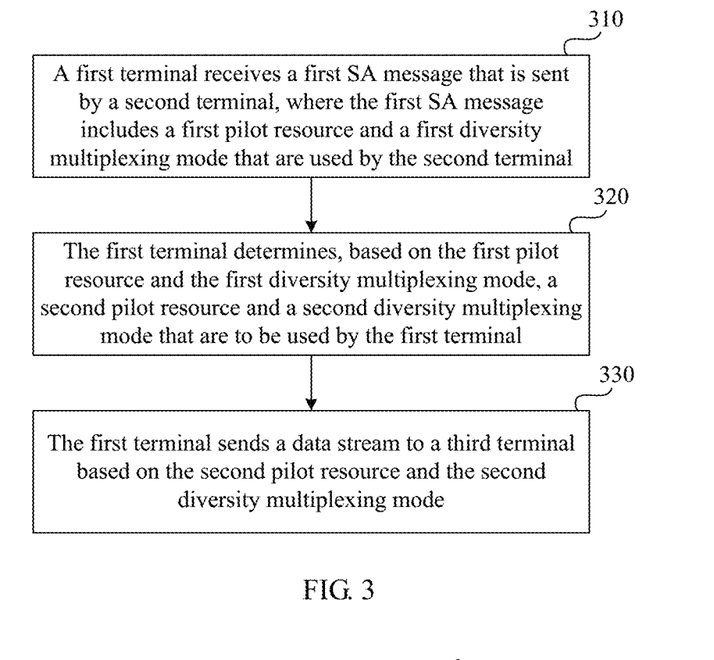
FIG. 3 is a flowchart of a V2V communication method according to an embodiment of the present invention.

With reference to FIG. 3, the following describes in detail a solution provided in an embodiment of the present invention. FIG. 3 is a flowchart of a V2V communication method according to this embodiment of the present invention. In this embodiment of the present invention, the method is executed by a first terminal. As shown in FIG. 3, this embodiment specifically includes the following steps.

Step 310: A first terminal receives a first SA message that is sent by a second terminal, where the first SA message includes a first pilot resource and a first diversity multiplexing mode that are used by the second terminal.

Specifically, the second terminal generates the first SA message, where the first SA message includes the first pilot resource and the first diversity multiplexing mode that are used by the second terminal. The first pilot resource is specifically a pilot occupied by the second terminal for subsequently sending a data stream. In this embodiment of the present invention, the second terminal may occupy at least one pilot for sending data. The first diversity multiplexing mode is specifically a sending mode in which the second terminal subsequently sends a data stream, and specifically includes a diversity mode or a multiplexing mode in a virtual multiple-input multiple-output (VMIMO) technology. When the multiplexing mode is used, a terminal may transmit different data streams on a plurality of independent paths, thereby making full use of system resources and improving a system capacity. Therefore, in this embodiment of the present invention, the multiplexing mode is used as an example for description.

Figure 4:
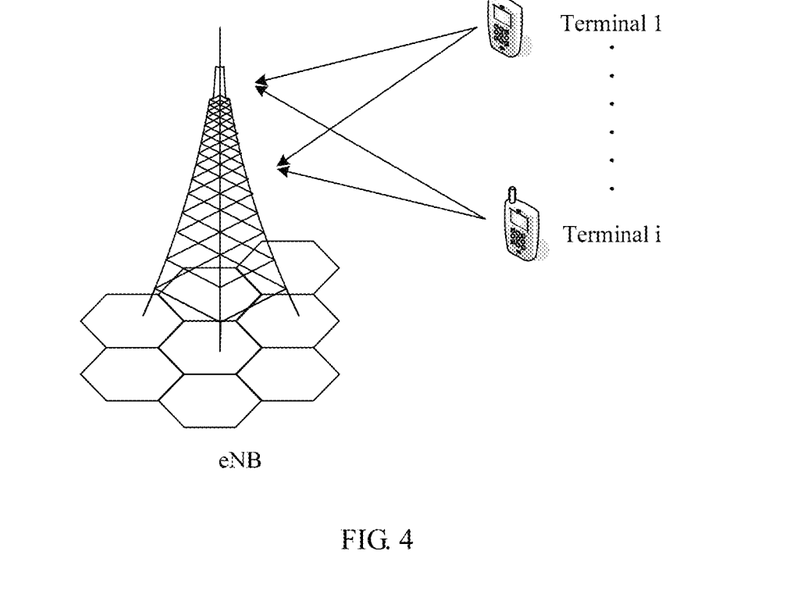
FIG. 4 is a schematic diagram of a virtual MIMO network structure according to an embodiment of the present invention.

FIG. 4 is a schematic diagram of a virtual MIMO network structure according to an embodiment of the present invention. As shown in FIG. 4, in a multi-antenna scenario in an LTE system, for example, a four-antenna scenario, a base station schedules a plurality of terminals (two or more users; for four receive antennas, four or fewer users) to simultaneously transmit data on a same time-frequency resource, so that more RB resources can be allocated for transmission on the same time-frequency resource. A scheduler on the base station side flexibly schedules various terminals by using an optimal pairing policy, and selects a terminal pair that is suitable for pairing to perform paired transmission, so as to improve a system throughput while maintaining link robustness.

In this embodiment of the present invention, based on a feature that a plurality of antennas of a terminal are not restricted by a size, power, or the like, the virtual MIMO technology is used, to reduce interference caused by resource reuse, improve resource reuse efficiency, and further improve an overall system capacity.

After generating the first SA message, the second terminal sends the first SA message in a network through broadcasting. All terminals in the network can receive the first SA message. In this embodiment of the present invention, that the first terminal receives the first SA message is used as an example for description.

Before step 310, a step of receiving, by the first terminal, a notification message from a base station is included. By using the message, the terminal obtains a set of pilot resources and a current diversity multiplexing mode. The set of pilot resources is specifically a set of orthogonal pilots, and the base station notifies the terminal of some or all pilots that can be configured for the terminal for sending a data stream subsequently. The diversity multiplexing mode is specifically a data stream sending mode that may be used by the terminal and that is notified by the base station to the terminal.

Step 320: The first terminal determines, based on the first pilot resource and the first diversity multiplexing mode, a second pilot resource and a second diversity multiplexing mode that are to be used by the first terminal.

Specifically, the first terminal obtains the first pilot resource and the first diversity multiplexing mode, to determine a pilot occupied when the second terminal sends a data stream and a sending mode for sending the data stream, and determines, based on the pilot occupied by the second terminal and the sending mode, the second pilot resource and the second diversity multiplexing mode that are to be used by the first terminal.

Further, the first terminal selects, from the set of pilot resources based on the first pilot resource, at least one pilot resource that is not used by the second terminal. The first terminal uses the selected at least one pilot resource that is not used by the second terminal, as the second pilot resource to be used by the first terminal. The first terminal determines, based on the first diversity multiplexing mode, whether the current diversity multiplexing mode is a diversity multiplexing mode paired with the first diversity multiplexing mode. If the current diversity multiplexing mode is a diversity multiplexing mode paired with the first diversity multiplexing mode, the first terminal uses the current diversity multiplexing mode as the second diversity multiplexing mode to be used by the first terminal.

The determining, by the first terminal, based on the first diversity multiplexing mode, whether the current diversity multiplexing mode is a diversity multiplexing mode paired with the first diversity multiplexing mode is specifically: determining, by the first terminal based on the first diversity multiplexing mode, whether the current diversity multiplexing mode can be used to receive and parse a message that is sent by using the first diversity multiplexing mode. The first terminal can receive and parse the message sent by the second terminal, only when the current diversity multiplexing mode is a diversity multiplexing mode paired with the first diversity multiplexing mode. For example, both the first terminal and the second terminal perform message transmission by using a spatial multiplexing mode.

In this embodiment of the present invention, the first terminal and the second terminal select paired diversity multiplexing modes, so that the first terminal and the second terminal can use a same time-frequency resource, to make full use of system resources and improve a system capacity.

In this embodiment of the present invention, the pairing specifically means: If both a channel correlation of the first diversity multiplexing mode and a channel correlation of the current diversity multiplexing mode are less than a channel threshold, the first diversity multiplexing mode and the current diversity multiplexing mode may be selected in pair.

It should be noted that the second pilot resource selected by the first terminal may be a different pilot that is located in a same time-frequency resource as the first pilot resource, or a pilot of a different time-frequency resource. In this embodiment of the present invention, different terminals may simultaneously use different pilots of a same time-frequency resource to send data streams simultaneously. This not only avoids interference caused by resource reuse and increases a correctness rate of subsequent data demodulation, but also fully utilizes system resources and improves a system capacity.

Step 330: The first terminal sends a data stream to a third terminal based on the second pilot resource and the second diversity multiplexing mode.

Specifically, the first terminal sends the data stream based on the second pilot resource and the second diversity multiplexing mode that are determined in step 320, and the third terminal receives the data stream.

In this step, the first terminal and the second terminal use different pilot resources; therefore, the two terminals use different pilot resources when sending data streams. This reduces interference caused by resource reuse, and increases a correctness rate of subsequent data demodulation.

Therefore, according to the V2V communication method provided in the embodiments of the present invention, a terminal can know a pilot resource and a diversity multiplexing mode that are used by another terminal. This avoids that a plurality of terminals use a same pilot resource, thereby reducing interference caused by resource reuse and increasing a correctness rate of subsequent data demodulation.

Optionally, the first SA message in this embodiment of the present invention further includes a location of a time-frequency resource occupied by the first pilot resource.

In this embodiment of the present invention, after the first terminal receives the first SA message sent by the second terminal, the first terminal may further receive, based on the first pilot resource and the first diversity multiplexing mode, a data stream sent by the second terminal.

In this embodiment of the present invention, the first terminal has not performed pilot resource pairing with the second terminal, that is, the first terminal has not determined, based on the first pilot resource and the first diversity multiplexing mode, the second pilot resource and the second diversity multiplexing mode to be used by the first terminal. In this case, the first terminal may still receive the data stream sent by the second terminal. If the first terminal has already determined the second pilot resource and the second diversity multiplexing mode, and the first pilot resource and the second pilot resource belong to a same time-frequency resource, according to an existing sending/receiving rule of the time-frequency resource, the first terminal cannot receive the data stream sent by the second terminal. If the first pilot resource and the second pilot resource belong to different time-frequency resources, the first terminal may receive the data stream sent by the second terminal.

The second terminal sends the data stream on the first pilot resource by using the first diversity multiplexing mode. The first terminal receives the data stream based on the first pilot resource and the first diversity multiplexing mode, and determines that the data stream is sent by the second terminal.

After receiving the data stream sent by the second terminal, the first terminal performs a step of performing channel estimation and demodulation on the data stream based on the first pilot resource, the first diversity multiplexing mode, and the location of the time-frequency resource occupied by the first pilot resource.

The location of the time-frequency resource occupied by the first pilot resource is specifically a location of the time-frequency resource occupied by the pilot in all time-frequency resources. The first terminal performs channel estimation and MIMO demodulation on the data stream based on the obtained three pieces of information, and displays the demodulated data to a user.

According to this step, the first terminal may parse and display the data stream sent by the second terminal, so that the user predicts a geographical location of the second terminal and a distance from the second terminal, and handles a dangerous situation in advance.

Further, the first SA message in this embodiment of the present invention further includes a quantity of multiplexing layers of the first terminal, where the quantity of multiplexing layers is specifically a quantity of terminals occupying a same time-frequency resource. It may be understood that one time-frequency resource includes a plurality of pilots, and each pilot may be occupied by different terminals. In other words, a plurality of terminals may transmit different data streams by using a same time-frequency resource, thereby making full use of system resources and improving a system capacity. However, a data stream cannot be transmitted between the plurality of terminals occupying pilots of the same time-frequency resource.

Optionally, before step 330, a step of sending, by the first terminal, a second SA message to the third terminal is further included. In this step, the third terminal determines the second pilot resource and the second diversity multiplexing mode that are to be used by the first terminal, and receives a data stream subsequently sent by the first terminal.

Specifically, the first terminal generates the second SA message, where the second SA message includes the second pilot resource and the second diversity multiplexing mode that are to be used by the first terminal, and includes a location of a time-frequency resource occupied by the second pilot resource. The third terminal performs, based on the second pilot resource, the second diversity multiplexing mode, and the location of the time-frequency resource occupied by the second pilot resource, channel estimation and demodulation on the data stream sent by the first terminal, and displays the demodulated data to the user.

It should be noted that after the third terminal receives the second SA message, if the third terminal expects to receive the data stream subsequently sent by the first terminal, the third terminal may not determine, based on the second SA message, a pilot resource and a diversity multiplexing mode to be used by the third terminal.

It may be understood that in this embodiment of the present invention, the third terminal may alternatively receive the first SA message, and receive, based on the first SA message, the data stream subsequently sent by the second terminal.

Optionally, in step 330 in this embodiment of the present invention, the sending, by the first terminal, a data stream to a third terminal based on the second pilot resource and the second diversity multiplexing mode is specifically: when the first terminal selects one pilot resource as the second pilot resource, sending, by the first terminal, a single data stream to the third terminal based on the second pilot resource and the second diversity multiplexing mode; or when the first terminal selects a plurality of pilot resources as the second pilot resource, sending, by the first terminal, a plurality of data streams to the third terminal based on the second pilot resource and the second diversity multiplexing mode.

For example, when the first terminal needs to send only one data stream, in step 320, the first terminal selects only one pilot that is not used by the second terminal, and sends the single data stream to the third terminal by using the pilot; or when the first terminal needs to send a plurality of data streams to the third terminal, in step 320, the first terminal selects a plurality of pilots that are not used by the second terminal, and sends the plurality of data streams to the third terminal by using the plurality of pilots.

According to this step, a terminal can transmit different data streams on a plurality of independent paths, thereby making full use of system resources and improving a system capacity.

Figure 5:
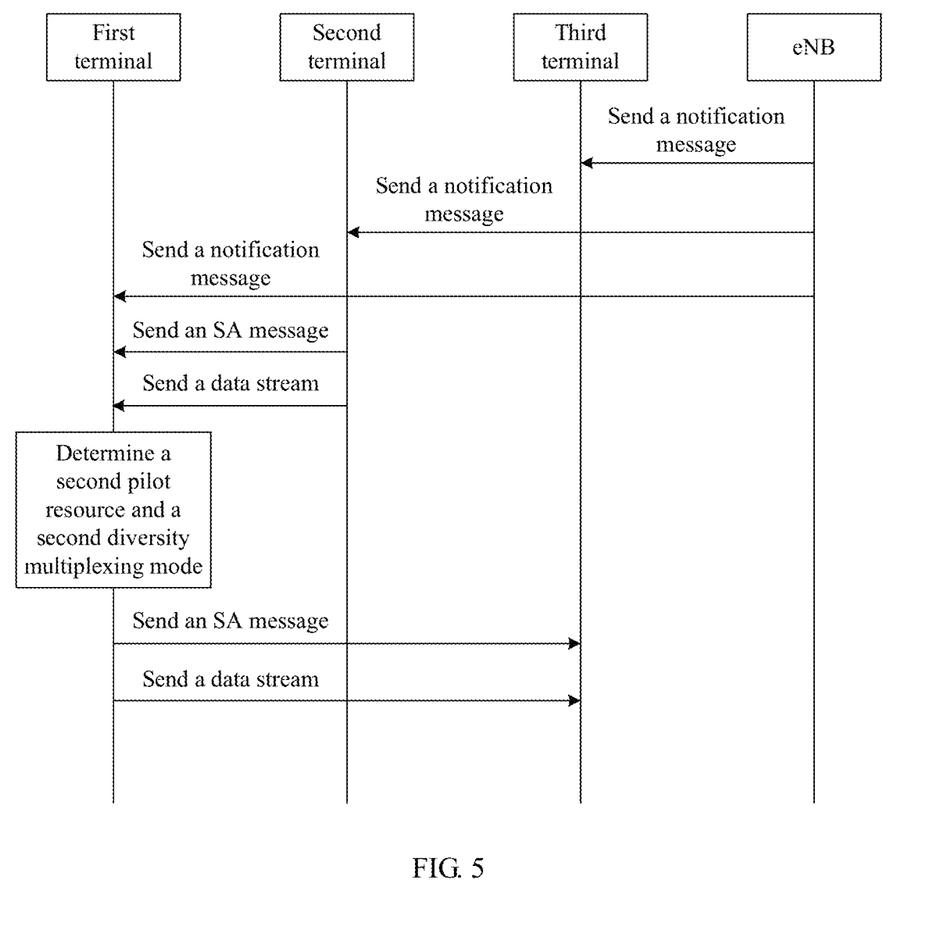
FIG. 5 is a time sequence diagram of V2V communication according to an embodiment of the present invention.

The following further describes the embodiments of the present invention with reference to more accompanying drawings. FIG. 5 is a time sequence diagram of a V2V communication method according to an embodiment of the present invention. As shown in FIG. 5, this embodiment specifically includes the following steps.

Step 510: A base station sends a notification message to a terminal through broadcasting.

Specifically, the base station sends the notification message through broadcasting, where the message includes a set of pilot resources available to the terminal and a current diversity multiplexing mode. In this embodiment of the present invention, the base station sends the notification message to a first terminal, a second terminal, and a third terminal. Each terminal determines some or all pilots that may be configured, and a currently available diversity multiplexing mode.

The notification message is specifically a physical broadcast channel (PBCH) message.

Step 520: The second terminal sends a first SA message.

Specifically, the second terminal generates the first SA message, where the first SA message includes a first pilot resource and a first diversity multiplexing mode that are used by the second terminal. The first pilot resource is specifically a pilot occupied by the second terminal for subsequently sending a data stream. In this embodiment of the present invention, the second terminal may occupy at least one pilot for sending data. The first diversity multiplexing mode is specifically a sending mode in which the second terminal subsequently sends a data stream, and specifically includes a diversity mode or a multiplexing mode in a VMIMO technology.

After generating the first SA message, the second terminal sends the first SA message in a network through broadcasting. All terminals in the network can receive the first SA message. In this embodiment of the present invention, that the first terminal receives the first SA message is used as an example for description.

Step 530: The first terminal receives a data stream sent by the second terminal.

Specifically, the second terminal sends the data stream on the first pilot resource by using the first diversity multiplexing mode. When not paired with the second terminal, the first terminal receives the data stream based on the first pilot resource and the first diversity multiplexing mode, and determines that the data stream is sent by the second terminal.

Further, the first SA message further includes a location of a time-frequency resource occupied by the first pilot resource. The first terminal performs channel estimation and MIMO demodulation on the data stream based on the obtained three pieces of information, and displays the demodulated data to a user.

Step 540: The first terminal determines a second pilot resource and a second diversity multiplexing mode that are to be used by the first terminal.

Specifically, the first terminal obtains the first pilot resource and the first diversity multiplexing mode, to determine a pilot occupied when the second terminal sends a data stream and a sending mode for sending the data stream, and determines, based on the pilot occupied by the second terminal and the sending mode, the second pilot resource and the second diversity multiplexing mode that are to be used by the first terminal.

Further, the first terminal selects, from the set of pilot resources based on the first pilot resource, at least one pilot resource that is not used by the second terminal. The first terminal uses the selected at least one pilot resource that is not used by the second terminal, as the second pilot resource to be used by the first terminal. The first terminal determines, based on the first diversity multiplexing mode, whether the current diversity multiplexing mode is a diversity multiplexing mode paired with the first diversity multiplexing mode. If the current diversity multiplexing mode is a diversity multiplexing mode paired with the first diversity multiplexing mode, the first terminal uses the current diversity multiplexing mode as the second diversity multiplexing mode to be used by the first terminal.

Step 550: The first terminal sends a second SA message to the third terminal.

Specifically, the first terminal generates the second SA message, where the second SA message includes the second pilot resource and the second diversity multiplexing mode that are to be used by the first terminal.

It may be understood that a process in which the first terminal generates the second SA message is the same as that in which the second terminal generates the first SA message, and details are not repeated herein.

Step 560: The first terminal sends a data stream to the third terminal.

Specifically, the first terminal sends the data stream based on the second pilot resource and the second diversity multiplexing mode that are determined in step 540, and the third terminal receives the data stream.

Further, the second SA message further includes a location of a time-frequency resource occupied by the second pilot resource. The third terminal performs channel estimation and MIMO demodulation on the data stream based on the obtained three pieces of information, and displays the demodulated data to a user.

Still further, when the first terminal selects one pilot resource as the second pilot resource, the first terminal sends a single data stream to the third terminal based on the second pilot resource and the second diversity multiplexing mode; or when the first terminal selects a plurality of pilot resources as the second pilot resource, the first terminal sends a plurality of data streams to the third terminal based on the second pilot resource and the second diversity multiplexing mode.

For example, when the first terminal needs to send only one data stream, in step 540, the first terminal selects only one pilot that is not used by the second terminal, and sends the single data stream to the third terminal by using the pilot; or when the first terminal needs to send a plurality of data streams to the third terminal, in step 540, the first terminal selects a plurality of pilots that are not used by the second terminal, and sends the plurality of data streams to the third terminal by using the plurality of pilots.

Figure 6:
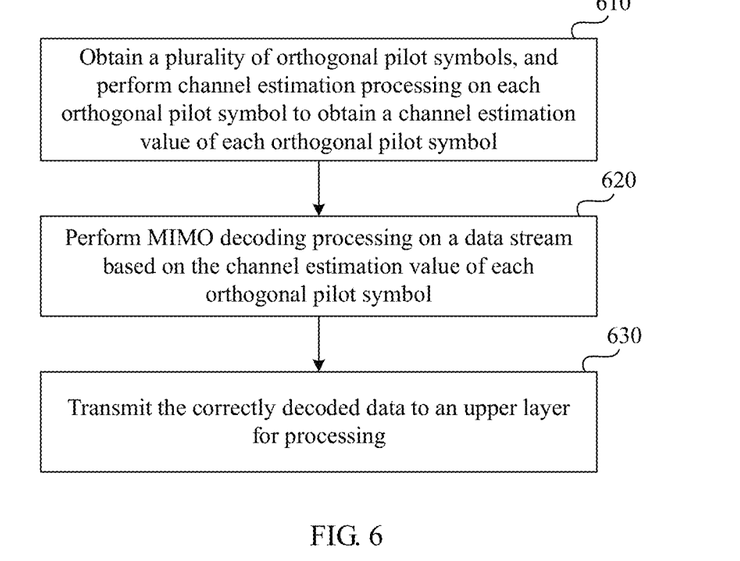
FIG. 6 is a flowchart of another V2V communication method according to an embodiment of the present invention.

With reference to FIG. 6, the following describes in detail a solution provided in an embodiment of the present invention. The following solution and the foregoing solution are two different solutions that are independent of each other. FIG. 6 is a flowchart of another V2V communication method according to this embodiment of the present invention. In this embodiment of the present invention, the method is executed by a first terminal. As shown in FIG. 6, this embodiment specifically includes the following steps.

Step 610: Obtain a plurality of orthogonal pilot symbols, and perform channel estimation processing on each orthogonal pilot symbol to obtain a channel estimation value of each orthogonal pilot symbol.

Specifically, the first terminal uses N stored orthogonal sequences as the orthogonal pilot symbols. Alternatively, a base station broadcasts a pilot message, and the first terminal selects, from the pilot message based on a capacity requirement of the first terminal, M required orthogonal sequences as the orthogonal pilot symbols.

After obtaining the plurality of orthogonal pilot symbols, the first terminal performs channel estimation processing on each orthogonal pilot symbol to obtain a channel estimation value $H(k,l)$ of each orthogonal pilot symbol.

The channel estimation value $H(k,l)$ is specifically $$H(k, l) = \begin{bmatrix} h_{0,0}(k, l) & h_{0,1}(k, l) \\ h_{1,0}(k, l) & h_{1,1}(k, l) \end{bmatrix}.$$

Step 620: Perform MIMO decoding processing on a data stream based on the channel estimation value of each orthogonal pilot symbol.

Specifically, the first terminal obtains a data stream sent by a second terminal, and obtains a data reception signal $R(k,l)$ from the data stream according to a data reception signal model. The first terminal estimates a data transmission signal based on the channel estimation value and the data reception signal, to implement the MIMO decoding processing on the data stream.

Further, it is assumed that the data transmission signal is $$S(k, l) = \begin{bmatrix} s_0(k, l) \\ s_1(k, l) \end{bmatrix}.$$

According to the data reception signal model, $R(k,l)=H(k,l)S(k,l)+U(k,l)$, where $U(k,l)$ is a noise signal.

Then a data transmission signal estimation value is $$\hat{S}(k, l) = \begin{bmatrix} \hat{s}_0(k, l) \\ \hat{s}_1(k, l) \end{bmatrix} = W(k, l)R(k, l),$$

where W(k,l) is a quantity of channels, and W(k,l) is determined according to the following formula: $W(k,l)=H^H(k,l)(H(k,l)H^H(k,l)+\delta^2 I)^{-1}$.

Step 630: Transmit the correctly decoded data to an upper layer for processing.

Specifically, the first terminal performs CRC check on a decoded data transmission signal. If a CRC check result is correct (the CRC check result is 0), the first terminal transmits the correctly decoded data transmission signal to the upper layer (an APP layer) for processing, for example, forwards the correctly decoded data transmission signal to the application layer for processing. If the CRC check result is wrong (the CRC check result is not 0), the first terminal performs decoding processing again on the data transmission signal that is incorrectly decoded, or directly discards the incorrectly decoded data transmission signal.

In this embodiment of the present invention, a terminal obtains the channel estimation value of each orthogonal pilot symbol by performing channel estimation processing on a plurality of orthogonal pilot symbols, performs MIMO decoding processing on the data stream based on the channel estimation value of each orthogonal pilot symbol, and transmits the correctly decoded data to the upper layer for processing. This improves a system capacity.

In the foregoing solution, when the terminal has a relatively large quantity of antennas and a traverse mode in step 620 is used, a computation amount for channel estimation and data demodulation is significantly increased. For example, if the terminal has four antennas, data decoding needs to be repeated for 10 times. However, in the case of multi-antenna MIMO decoding, the computation amount increases sharply along with an increase of the quantity of antennas because of matrix inversion, increasing chip complexity and power consumption.

It should be noted that in this embodiment of the present invention, the first terminal receives the data stream sent by the second terminal, and the second terminal sends the data stream on a pilot resource selected by the second terminal. Certainly, the first terminal may also send out a data stream on a pilot resource selected by the first terminal. If the first terminal and the second terminal simultaneously send data streams by using a same pilot resource, a problem of interference caused by resource reuse may arise.

Figure 7:
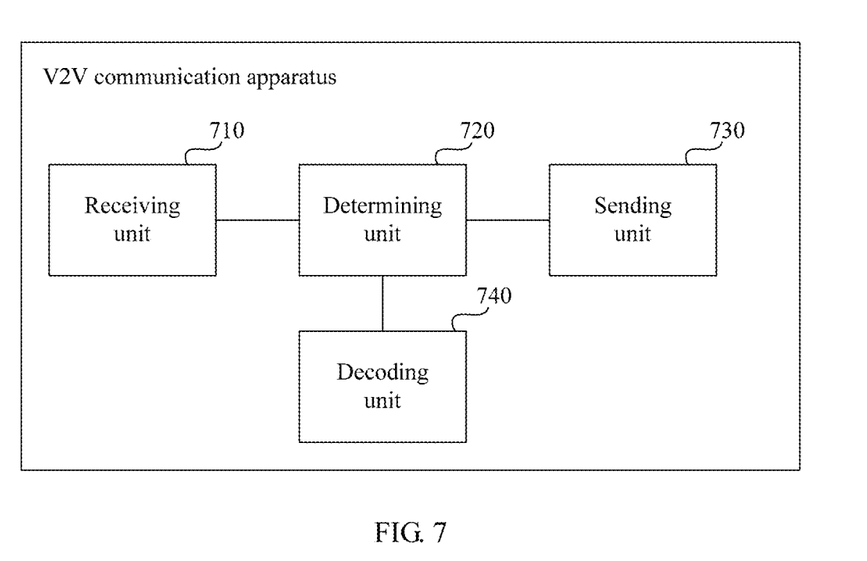
FIG. 7 is a schematic structural diagram of a V2V communication apparatus according to an embodiment of the present invention.

All the methods described in the foregoing embodiments can implement V2V communication. Correspondingly, an embodiment of the present invention further provides a V2V communication apparatus for implementing the V2V communication method provided in the foregoing embodiments. As shown in FIG. 7, the apparatus includes a receiving unit 710, a determining unit 720, and a sending unit 730.

The receiving unit 710 is configured to receive a first SA message that is sent by a second terminal, where the first SA message includes a first pilot resource and a first diversity multiplexing mode that are used by the second terminal.

The determining unit 720 is configured to determine, based on the first pilot resource and the first diversity multiplexing mode, a second pilot resource and a second diversity multiplexing mode that are to be used by the apparatus.

The sending unit 730 is configured to send a data stream to a third terminal based on the second pilot resource and the second diversity multiplexing mode.

Further, the receiving unit 710 is configured to receive a notification message from a base station, where the notification message includes a set of pilot resources available to the apparatus and the second terminal and a current diversity multiplexing mode.

Further, the determining unit 720 is specifically configured to: select, from the set of pilot resources based on the first pilot resource, at least one pilot resource that is not used by the second terminal;

use the selected at least one pilot resource that is not used by the second terminal, as the second pilot resource to be used by the apparatus;

determine, based on the first diversity multiplexing mode, whether the current diversity multiplexing mode is a diversity multiplexing mode paired with the first diversity multiplexing mode; and if the current diversity multiplexing mode is a diversity multiplexing mode paired with the first diversity multiplexing mode, use the current diversity multiplexing mode as the second diversity multiplexing mode to be used by the apparatus.

Further, the first SA message received by the receiving unit 710 further includes a location of a time-frequency resource occupied by the first pilot resource;

the receiving unit 710 is further configured to receive, based on the first pilot resource and the first diversity multiplexing mode, a data stream sent by the second terminal; and the apparatus further includes a decoding unit 740, configured to perform channel estimation and demodulation on the data stream based on the first pilot resource, the first diversity multiplexing mode, and the location of the time-frequency resource occupied by the first pilot resource.

Further, the sending unit 730 is configured to send a second SA message to the third terminal, where the second SA message includes the second pilot resource and the second diversity multiplexing mode that are to be used by the apparatus, and includes a location of a time-frequency resource occupied by the second pilot resource, and the second SA message is used by the third terminal to perform, based on the second pilot resource, the second diversity multiplexing mode, and the location of the time-frequency resource occupied by the second pilot resource, channel estimation and demodulation on the data stream sent by the sending unit.

Further, the sending unit 730 is specifically configured to:

when the determining unit 720 selects one pilot resource as the second pilot resource, send one data stream to the third terminal based on the second pilot resource and the second diversity multiplexing mode; or when the determining unit 720 selects a plurality of pilot resources as the second pilot resource, send a plurality of data streams to the third terminal based on the second pilot resource and the second diversity multiplexing mode.

Figure 8:
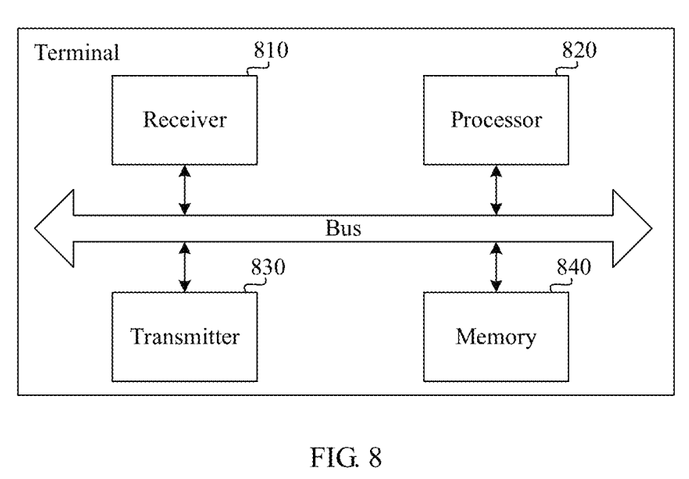
FIG. 8 is a schematic structural diagram of a terminal according to an embodiment of the present invention.

In addition, the V2V communication apparatus provided in this embodiment of the present invention may further use the following implementation to implement the V2V communication method in the foregoing embodiments of the present invention. As shown in FIG. 8, a terminal includes a receiver 810, a processor 820, a transmitter 830, and a memory 840.

It may be understood that in the foregoing V2V communication apparatus embodiment, the receiving unit 710 may be implemented by using the receiver 810 in this embodiment of the present invention, and the sending unit 730 may be implemented by using the transmitter 830 in this embodiment of the present invention.

The determining unit 720 and the decoding unit 740 may be implemented by using the processor 820 in this embodiment of the present invention. The processor 820 also executes a processing process related to the terminal in FIG. 5 and FIG. 6 and/or another process used for a technology described in this application.

The memory 840 is configured to store program code and data of the terminal.

It can be understood that FIG. 8 shows only a simplified design of the terminal. In actual application, the terminal may include any quantity of transmitters, receivers, processors, controllers, memories, and the like, and all terminals that may implement the present invention fall within the protection scope of the present invention.

The controller/processor configured to perform a function of the foregoing terminal in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor can implement or execute various example logical blocks, modules, and circuits that are described with reference to the content disclosed in the present invention. Alternatively, the processor may be a combination implementing a computing function, for example, a combination of one or more microprocessors, or a combination of a DSP and a microprocessor.

Method or algorithm steps described with reference to the content disclosed in the present invention may be implemented by using hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the present invention are further described in detail. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A vehicle to vehicle (V2V) communication method, wherein the method comprises:
   receiving, by a first terminal, a notification message from a base station, wherein the notification message comprises a current diversity multiplexing mode and a set of pilot resources available to the first terminal and a second terminal;
   receiving, by the first terminal, a first scheduling assignment (SA) message that is sent by the second terminal, wherein the first SA message comprises a first pilot resource and a first diversity multiplexing mode that are used by the second terminal;
   determining, by the first terminal based on the first pilot resource and the first diversity multiplexing mode, a second pilot resource and a second diversity multiplexing mode that are to be used by the first terminal, wherein the determining the second pilot resource and the second diversity multiplexing mode comprises:
      selecting, by the first terminal from the set of pilot resources and based on the first pilot resource, at least one pilot resource that is not used by the second terminal;
      using the selected at least one pilot resource that is not used by the second terminal, as the second pilot resource to be used by the first terminal;
      determining, by the first terminal based on the first diversity multiplexing mode, whether the current diversity multiplexing mode is a diversity multiplexing mode paired with the first diversity multiplexing mode; and
      in response to determining that the current diversity multiplexing mode is a diversity multiplexing mode paired with the first diversity multiplexing mode, using, by the first terminal, the current diversity multiplexing mode as the second diversity multiplexing mode to be used by the first terminal; and
   sending, by the first terminal, a data stream to a third terminal based on the second pilot resource and the second diversity multiplexing mode.

2. The method according to claim 1, wherein the first SA message further comprises a location of a time-frequency resource occupied by the first pilot resource; and
   after the receiving, by the first terminal, the first scheduling assignment (SA) message that is sent by a second terminal, the method further comprises:
      receiving, by the first terminal based on the first pilot resource and the first diversity multiplexing mode, a second data stream sent by the second terminal; and
      performing, by the first terminal, channel estimation and demodulation on the second data stream based on the first pilot resource, the first diversity multiplexing mode, and the location of the time-frequency resource occupied by the first pilot resource.

3. The method according to claim 1, wherein before the sending, by the first terminal, the data stream to a third terminal based on the second pilot resource and the second diversity multiplexing mode, the method further comprises:
   sending, by the first terminal, a second SA message to the third terminal, wherein the second SA message comprises the second pilot resource and the second diversity multiplexing mode that are to be used by the first terminal, the second SA message comprises a location of a time-frequency resource occupied by the second pilot resource, and wherein the second SA message is used by the third terminal to perform, based on the second pilot resource, the second diversity multiplexing mode, and the location of the time-frequency resource occupied by the second pilot resource, channel estimation and demodulation on the data stream sent by the first terminal.

4. The method according to claim 1, wherein the sending, by the first terminal, the data stream to the third terminal based on the second pilot resource and the second diversity multiplexing mode comprises one of the following:

when the first terminal selects one pilot resource as the second pilot resource, sending, by the first terminal, one data stream to the third terminal based on the second pilot resource and the second diversity multiplexing mode; or when the first terminal selects a plurality of pilot resources as the second pilot resource, sending, by the first terminal, a plurality of data streams to the third terminal based on the second pilot resource and the second diversity multiplexing mode.

5. A vehicle to vehicle (V2V) communication apparatus, wherein the apparatus comprises:

a receiver, configured to:
receive a notification message from a base station, wherein the notification message comprises a current diversity multiplexing mode and a set of pilot resources available to the apparatus and a second terminal;
receive a first scheduling assignment (SA) message that is sent by the second terminal, wherein the first SA message comprises a first pilot resource and a first diversity multiplexing mode that are used by the second terminal;

a non-transitory memory storage comprising instructions;

one or more hardware processors in communication with the non-transitory memory storage, wherein the one or more hardware processors execute the instructions to:
determine, based on the first pilot resource and the first diversity multiplexing mode, a second pilot resource and a second diversity multiplexing mode that are to be used by the apparatus, wherein the one or more hardware processors execute the instructions to determine the second pilot resource and the second diversity multiplexing mode comprises the one or more hardware processors execute the instructions to:
select, from the set of pilot resources and based on the first pilot resource, at least one pilot resource that is not used by the second terminal;
use the selected at least one pilot resource that is not used by the second terminal, as the second pilot resource to be used by the apparatus;
determine, based on the first diversity multiplexing mode, whether the current diversity multiplexing mode is a diversity multiplexing mode paired with the first diversity multiplexing mode; and
in response to determining that the current diversity multiplexing mode is a diversity multiplexing mode paired with the first diversity multiplexing mode, use the current diversity multiplexing mode as the second diversity multiplexing mode to be used by the apparatus; and a transmitter, configured to send a data stream to a third terminal based on the second pilot resource and the second diversity multiplexing mode.

6. The apparatus according to claim 5, wherein the first SA message received by the receiver further comprises a location of a time-frequency resource occupied by the first pilot resource;

the receiver is further configured to receive, based on the first pilot resource and the first diversity multiplexing mode, a second data stream sent by the second terminal; and the one or more hardware processors further execute the instructions to perform channel estimation and demodulation on the second data stream based on the first pilot resource, the first diversity multiplexing mode, and the location of the time-frequency resource occupied by the first pilot resource.

7. The apparatus according to claim 5, wherein the transmitter is further configured to send a second SA message to the third terminal, the second SA message comprises the second pilot resource and the second diversity multiplexing mode that are used by the apparatus, the second SA message comprises a location of a time-frequency resource occupied by the second pilot resource, and wherein the second SA message is used by the third terminal to perform, based on the second pilot resource, the second diversity multiplexing mode, and the location of the time-frequency resource occupied by the second pilot resource, channel estimation and demodulation on the data stream sent by the transmitter.

8. The apparatus according to claim 5, wherein the transmitter is configured to perform one of the following:

when the one or more hardware processors selects one pilot resource as the second pilot resource, send one data stream to the third terminal based on the second pilot resource and the second diversity multiplexing mode; or when the one or more hardware processors selects a plurality of pilot resources as the second pilot resource, send a plurality of data streams to the third terminal based on the second pilot resource and the second diversity multiplexing mode.

* * * * *